N. L. BRASS.
Sulky-Harrow.
No. 223,471. Patented Jan. 13, 1880.
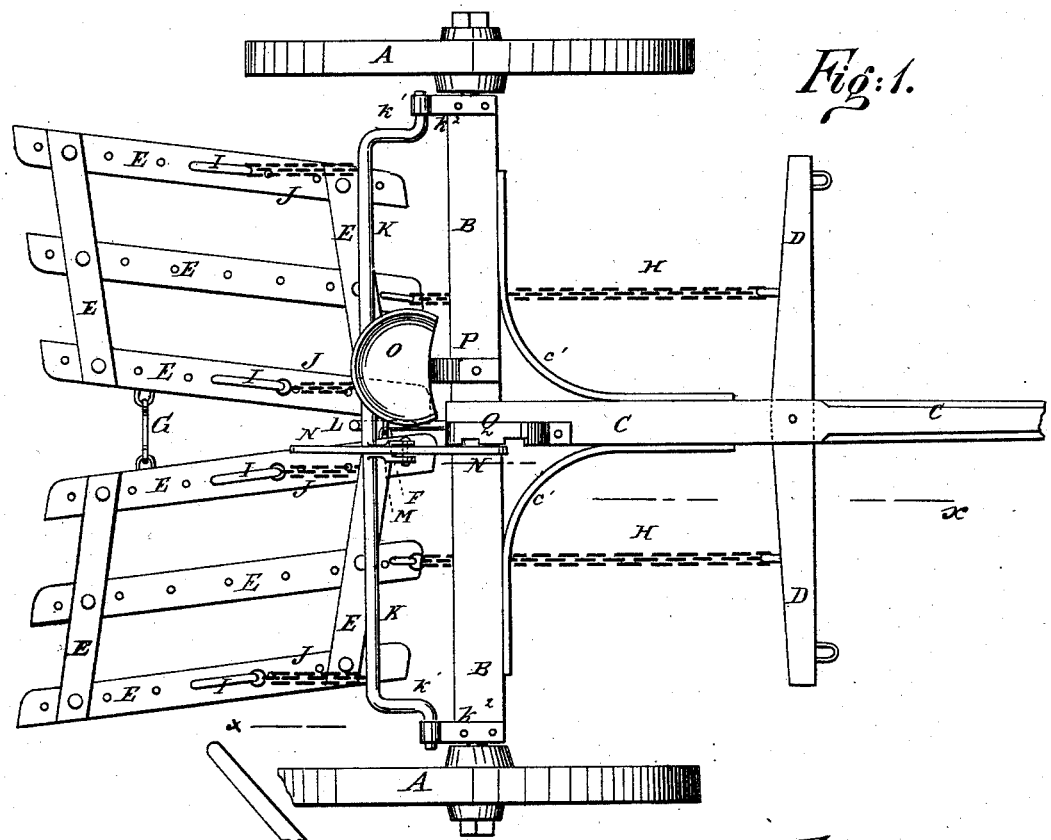
Fig: 1.
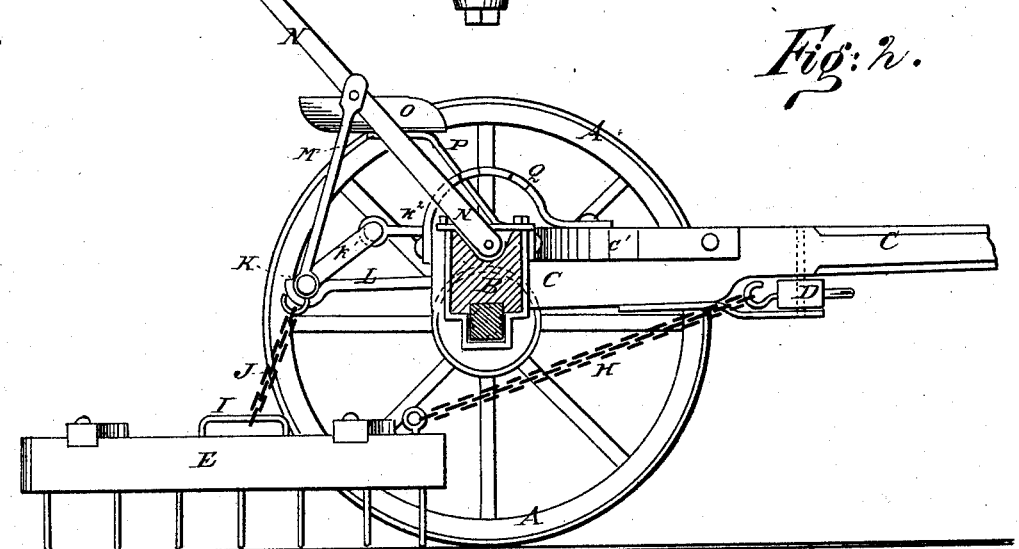
Fig: 2.
WITNESSES:
Chas. Nieta.
C. Sedgwick
INVENTOR:
N. L. Brass
BY Munn & C.
ATTORNEYS.

UNITED STATES PATENT OFFICE.

NATHAN L. BRASS, OF JUNIATA, NEBRASKA.

SULKY-HARROW.

SPECIFICATION forming part of Letters Patent No. 223,471, dated January 13, 1880.

Application filed September 24, 1879.

To all whom it may concern:

Be it known that I, NATHAN L. BRASS, of Juniata, in the county of Adams and State of Nebraska, have invented a new and useful Improvement in Sulky-Harrows, of which the following is a specification.

Figure 1 is a top view of my improved harrow. Fig. 2 is a side view of the same, partly in longitudinal section, through the broken line $x$ $x$, Fig. 1.

Similar letters of reference indicate corresponding parts.

The object of this invention is to furnish an improved sulky-harrow which shall be simple in construction and convenient in use, being easily raised from the ground and adjusted to work at any desired depth in the soil.

A are the wheels, which revolve upon the journals of the axle B. To the middle part of the axle B is attached the rear end of the tongue C, which is strengthened in position by the braces or hounds $c'$.

To the lower side of the tongue C is pivoted the double-tree D, to the ends of which single-trees are designed to be connected in the usual way.

E is the harrow-frame, which is made in two parts, each part being formed of three or more parallel longitudinal bars connected near their ends by cross-bars. The two parts of the harrow-frame are connected near their inner forward corners by a short link or bar connection, F, and near their inner rear corners by a longer link or bar connection, G, the joints of which allow the two parts of the harrow-frame to move independently of each other, so that the harrow can adjust itself to the surface of uneven ground. The bars of the parts of the harrow-frame are so arranged as to give the said parts a slight diamond-shaped form, as shown in Fig. 1.

To the middle part of the forward end of each part of the harrow-frame is attached the rear end of a chain, H, the forward end of which is attached to the double-tree D at a little distance from its end.

By the attachment of the chains H directly to the double-tree D the employment of an intermediate frame-work is avoided, the machine rendered lighter, and more readily controlled in turning.

To the middle parts of the side bars of each part of the harrow-frame are attached long staples I, with which are connected the lower ends of two chains, J.

The upper ends of the chains J are attached to the shaft K, which has crank-arms $k'$ formed upon its ends. The crank-arms $k'$ are pivoted to eye-straps or arms $k^2$, attached to the axle B near its ends, so that the harrow-frame may be raised from the ground by turning the said crank-shaft upon its pivots.

The use of long staples I permits the sliding and self-adjustment of the harrow in the act of rising from the ground, and facilitates the proper balancing of the harrow.

The crank-shaft K, when lowered, rests upon the rear end of the arm L, the forward end of which is rigidly attached to the middle part of the axle B or to the rear end of the tongue C. To the middle part of the crank-shaft K is pivoted the lower end of the bar M, the upper end of which is pivoted to the lever N. The lower end of the lever N is pivoted to the middle part of the axle B, and its upper end projects into such a position that it may be conveniently reached and operated by the driver sitting upon the seat O, which is attached to the upper end of the standard P.

The lower end of the standard P is attached to the middle part of the axle B, and should be adjustable, so that the driver's weight may be used to balance the machine.

The lever N moves along the notched edge of the arched bar Q, the ends of which are attached to the rear part of the tongue C, so that the said lever and the harrow-frame may be held securely in any position into which they may be adjusted.

This construction allows the harrow to be adjusted to work at any desired depth in the soil, as the work to be done may require, and to be raised from the ground for convenience in turning around and in passing from place to place.

I am aware that it is not new to connect a harrow or plow with a double-tree under the tongue, or to lift it by means of a chain and crank-shaft; but

What I claim as new and of my invention is—

The combination of the harrows, connected by chains at front and rear with sulky-frame, the bail or crank-shaft K, the sustaining axle-arm L, the rod M, and the axle-lever N, as shown and described.

NATHAN L. BRASS.

Witnesses:
WINFIELD ACKLEY,
SAMUEL L. BRASS.